March 15, 1960     T. R. BONES     2,928,354
RECIRCULATING DEVICE
Filed Aug. 14, 1957     2 Sheets-Sheet 1
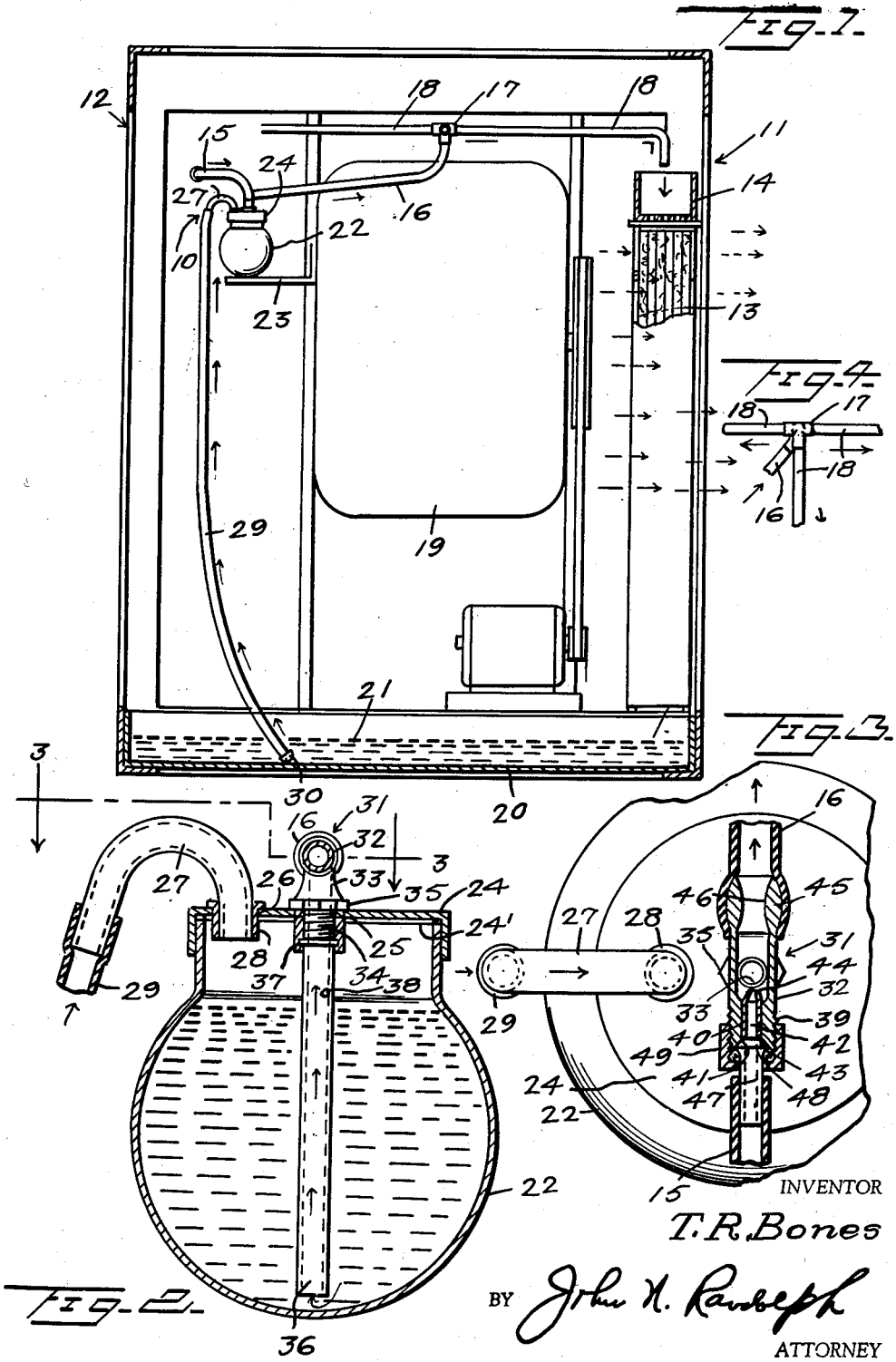
INVENTOR
*T. R. Bones*
BY *John N. Randolph*
ATTORNEY March 15, 1960 T. R. BONES 2,928,354
RECIRCULATING DEVICE
Filed Aug. 14, 1957 2 Sheets-Sheet 2
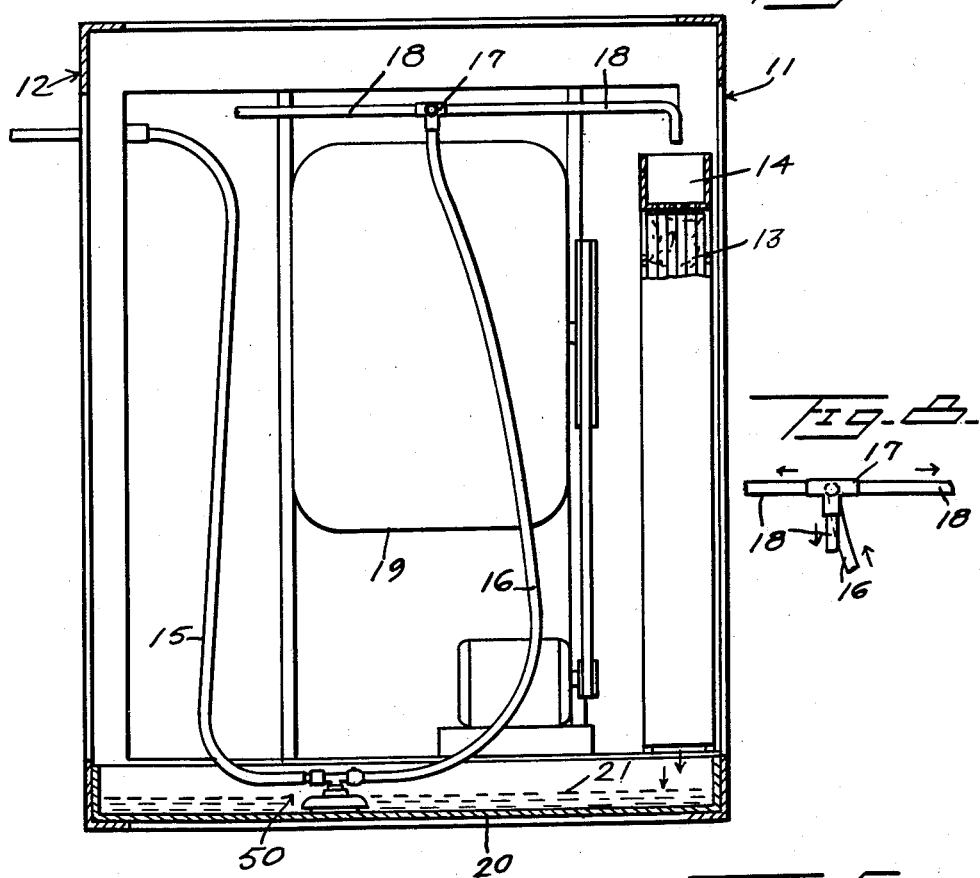
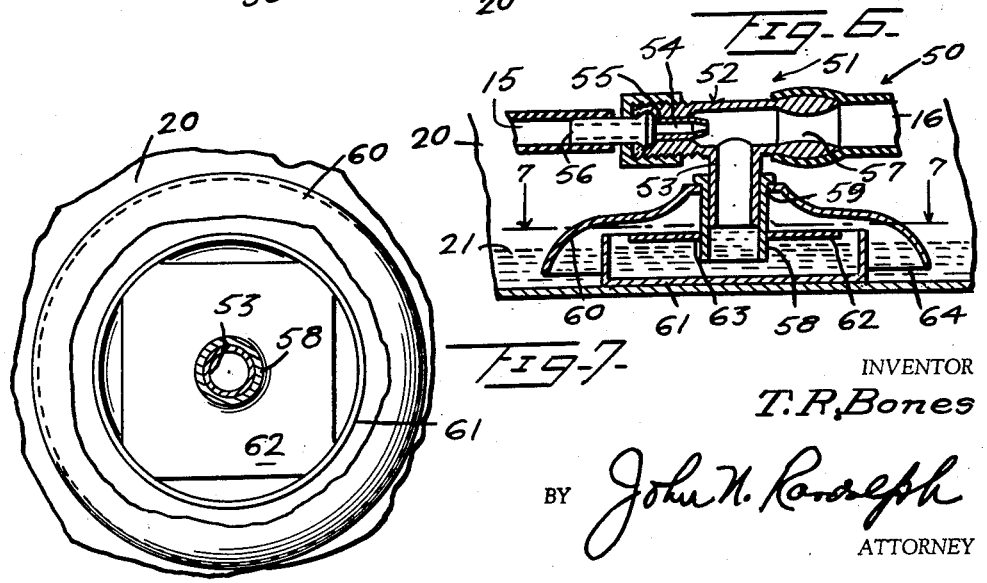
INVENTOR
T. R. Bones
BY John N. Randolph
ATTORNEY

United States Patent Office 2,928,354
Patented Mar. 15, 1960

2,928,354

RECIRCULATING DEVICE

Theodore R. Bones, Amarillo, Tex.

Application August 14, 1957, Serial No. 678,239

2 Claims. (Cl. 103—262)

This invention relates to a novel device or unit of extremely simple construction for recirculating a liquid from a sump.

More particularly, it is an object of the present invention to provide a recirculating device of extremely simple construction adapted to be interposed in a supply conduit of a liquid under pressure for utilizing pressure of the liquid supplied through the conduit for drawing liquid from a sump into the supply line.

Another object of the invention is to provide a recirculating device which is especially adapted for use in connection with an evaporative type air conditioner for drawing water from the collection receptacle or sump of the air conditioner into the pressure supply line by which water is supplied to the air conditioner from a supply source to thereby effect re-use of the water draining from filter pads, for the twofold purpose of effecting a substantial saving in water consumption and to eliminate the necessity of otherwise emptying or disposing of the water from the drain pan or sump.

Various other objects and advantages of the invention will hereinafter become more fully apparent from the following description of the drawings, illustrating presently preferred embodiments thereof, and wherein:

Figure 1 is a fragmentary vertical sectional view of a portion of a conventional evaporative type air conditioner and showing one form of the recirculating device, in elevation, associated therewith;

Figure 2 is an enlarged fragmentary vertical sectional view of a part of the recirculating device;

Figure 3 is an enlarged horizontal sectional view, partly broken away, taken substantially along a plane as indicated by the line 3—3 of Figure 2;

Figure 4 is a fragmentary plan view of a part of the conduit system of the air conditioner;

Figure 5 is a view similar to Figure 1 illustrating another form of the recirculating device;

Figure 6 is an enlarged vertical sectional view through a part of the recirculating device of Figure 5;

Figure 7 is a horizontal sectional view taken substantially along a plane as indicated by the line 7—7 of Figure 6, and Figure 8 is a view similar to Figure 4.

Referring more specifically to the drawings, and first with reference to Figures 1 to 4, the recirculating device as disclosed therein in its entirety and comprising the invention is designated generally 10. For the purpose of illustrating one preferred application and use of the recirculating device 10, a portion of a conventional evaporative type air conditioner is illustrated in Figure 1 and designated generally 11 including an open frame 12 having a plurality of open sides in which are mounted air filter pads 13 above which are disposed troughs 14 having perforated bottoms for supplying water to the pads 13. A main water supply conduit 15 leads from a source of water supply under pressure and is connected by a conduit section 16 and a coupling 17 to branch conduits 18. The branch conduits 18 discharge into the troughs 14, as illustrated in Figure 1. A driven blower 19 is suitably supported in the frame 12 for propelling air through the moistened filter pads 13 in a conventional manner. The bottoms of the filter pads 13 are located over a relatively shallow open top receptacle 20 mounted in the bottom of the frame 12 and forming the sump of the air conditioner 11 in which the water 21 draining from the air conditioner pads 13 is collected. The parts 11 through 20 are of conventional construction and form no part of the present invention but have been illustrated and briefly described merely to disclose one type of apparatus or environment in which the recirculating device 10 may be advantageously employed.

The recirculating device 10 includes a receptacle or bowl 22 which is supported in the frame 12 above the pan 20, as for example on a bracket 23 which is supported by a part of the frame 12. A cap or closure 24 is mounted on the open top of the container 22 and a sealing gasket 24' may be provided to prevent air entering the container 22 or escaping therefrom between said container and the closure 24. The top of the closure 24 is provided with two openings 25 and 26. One end of a rigid hook shaped tube 27 extends inwardly through the opening 26 and a sealing gasket 28 is disposed around said tube end and in the opening 26 to prevent air entering or escaping through the opening 26 around the tube 27. A conduit 29, preferably a flexible conduit such as a hose, has one end stretched over and connected to the opposite end of the tube 27 and has an opposite inlet end which is preferably equipped with a weighted intake nozzle 30. The conduit or hose 29 is of a sufficient length so that the suction head 30 thereof rests on the bottom of the pan 20 and is disposed below the level of the water 21 within said pan, as seen in Figure 1.

A fitting, designated generally 31 and best seen in Figures 2 and 3, includes a tube 32 and a tube 33, which tubes combine to form a T-coupling, with the tube 33 extending downwardly from the intermediate portion of the tube 32. The lower portion of the tube 33 is externally threaded as seen at 34 and has a nut 35 mounted thereon. The threaded portion 34, disposed below the nut 35, extends downwardly through the closure opening 25 and has a relatively snug fitting engagement therein. A rigid tube 36 has a nut 37 swivelly mounted on the upper end thereof which is threadedly connected to the threaded tube portion 34 that extends downwardly from the inner side of the closure 24. The nuts 35 and 37 are tightened on the threaded tube portion 34 against opposite sides of the closure 24 to provide an airtight seal for the opening 25 around the tube 33. The tube 36 is thus attached to the tube 33 and is supported by the closure 24 with the open bottom of the tube 36 disposed above but adjacent the bottom of the container 22, as seen in Figure 2. The tube 36 is provided with a small port 38 located adjacent to but spaced from the upper end thereof.

As best seen in Figure 3, the tube 32 has an externally threaded end 39 and is provided with an internal restriction 40, adjacent said end 39 and which is provided with a flared outer end 41. A small nozzle or jet 42 is mounted in the restricted bore portion 40 and has a slightly flared rear inlet end 43 which seats in the inner part of the flared bore end 41 and an internally and externally tapered opposite discharge end 44 which discharges above the upper edge portion of the upper end of the tube 33 which is located adjacent the bore portion 40. The inlet end of the flexible conduit or hose 16 is secured over an externally bulged opposite end 45 of the tube 32, which end is provided with an internal restriction 46 which flares toward both ends thereof. The end of the tube 33, which opens into the tube 32, is disposed between the discharge end 44 of the nozzle 42 and the restricted throat 46, as seen in Figure 3.

A nipple 47 connects the discharge end of the supply pipe 15 to the flared end 41 of the tube 32 and has one end secured by a press fit engagement in said conduit 15 and is provided with an enlarged head 48 at its opposite end which conformably seats in the flared bore end 41, outwardly of the nozzle end 43. A cap nut 49 is swivelly mounted on the nipple 47, between the head 48 and the conduit 15, and is threadedly connected to the threaded tube portion 39 for providing a liquid tight seal between said nipple 47 and the nozzle 42.

From the foregoing it will be readily apparent that when water is being supplied to the pads 13 through the pressure supply line 15, that the water will be ejected under pressure from the nozzle tip 44 toward the restricted throat 46 to produce a suction in the tube 33. When this occurs, the air in the tube 36 and container 22 will be evacuated. When a sufficient vacuum exists in the container 22 and in the tubes 27 and 29, water will be drawn upwardly through the tube 29 from the sump pan 20 into the container 22. When the water level in the container 22 covers the lower end of the tube 36, water will thereafter be drawn upwardly through the tubes 36 and 33 into the tube 32 to be conveyed with the water emitted from the nozzle 42 through the conduit 16, coupling 17 and branch conduits 18 to the pads 13. As the majority of the water supplied to the pads 13 from the troughs 14 drains into the pan 20, the recirculating device 10 eliminates the necessity of periodically draining the pan 20 and also effects a substantial saving in water since a majority of the water supplied to the troughs 14 will be from the container 22 and a relatively small amount of the water will be supplied from the pressure line 15. It will be apparent that the pressure in the line 15 is utilized to operate the recirculating unit 10. The container 22 is provided to afford a reserve supply of water after the device 10 has been once placed in operation so that water will be supplied almost immediately to the fitting 31 through the tubes 36 and 33 when water is ejected under pressure from the nozzle 42. Otherwise, if the conduit 29 were connected directly to the tube 33 air would have to be evacuated from said conduit before water would be supplied to the tube 33. The port 38 is provided adjacent the upper end of the tube 36 for evacuating any air from the upper portion of the container 22 when sufficient water has accumulated in the bottom of said container to cover the lower end of the tube 36.

Figures 4 to 7 illustrate a slightly different embodiment of the recirculating device, designated generally 50 and which is illustrated in conjunction with the same evaporative air conditioning unit 11, the various parts of which, previously described, are identified by the same reference numerals in Figure 5.

The unit 50 is mounted directly in the sump pan 20 and includes a fitting 51 substantially corresponding to the fitting 31 having a tube 52 and a tube 53, which communicates with and extends downwardly from the intermediate portion of the tube 52. The tube 52 corresponds in all respects with the tube 32 and has a nozzle 54, corresponding to the nozzle 42, mounted in a restricted bore portion 55 of said tube 52, in the same manner that the nozzle 42 is mounted in the bore portion 40. The discharge end of the pressure supply line 15 is connected by a nipple 56, corresponding to the nipple 47, to the tube 52 in exactly the same manner that the nipple 47 is connected to the tube 32. The flexible conduit or hose 16 is connected to the oposite end of the tube 52 and said last mentioned end has an internal restriction or throat 57, corresponding to the throat 46.

The downwardly extending tube 53 differs from the tube 33 in that said tube 53 has a press fit or other conventional engagement in the upper portion of a sleeve 58. The upper portion of the sleeve 58 extends through and is secured in an opening 59 of the top central portion of a downwardly opening hood 60. A shallow container 61 has a plate 62 spanning a part of the open top thereof and secured to spaced portions of the rim of said container 61, as best seen in Figure 7. A portion of the sleeve 58 extends through and is conventionally secured rigidly in a central opening 63 of the plate 62, so that the lower end of the sleeve 58 opens into the container 61 above but adjacent the bottom thereof, and so that the upper portion of the sleeve 58 supports the hood 60 with the central portion of said hood disposed above and spaced from the open top of the container 61, and with the open bottom 64 of the hood located above the level of the bottom of the container 61, substantially below the level of the open top of the container 61 and disposed around and spaced from said container 61, as clearly illustrated in Figure 6. A portion of the tube 53 extends upwardly from the upper end of the sleeve 58 for supporting the tube 52 above and spaced from said sleeve 58 and the hood 60.

The bottom of the container 61 rests on the bottom of the pan 20 for supporting the recirculating device 50 within the pan 20 and so that the open bottom 64 of the hood will be disposed below the level of the liquid 21 in the pan 20. When water is supplied under pressure to the nozzle 54 from the pressure line 15, in the same manner as previously described in reference to the recirculating device 10, a suction will be created in the tube 53 for evacuating the air from the container 61 and hood 60 into the fitting 51, after which water 21 from the pan 20 will be drawn upwardly through the open bottom of the hood 60 into the container 61 through the open top thereof and around the top plate 62. When a sufficient amount of water has accumulated in the container 61 to cover the lower end of the sleeve 58, the water 21 will be drawn upwardly through said sleeve and the tube 53 into the tube 52 and discharged therefrom through the throat 58 into the conduit 16 with the water under pressure from the nozzle 54. Thus, the unit 50 will function in substantially the same manner as previously described in reference to the unit 10 for recycling the water from the sump pan to the pads 13 and so that only a small percentage of the water supplied to the pads 13 will constitute water freshly supplied from the supply line 15. The unit 50 will thus function like the unit 10 to reduce the water consumption of the air conditioner 11 to a minimum and for extracting and re-using the water 21 from the pan 20 so that said pan will not have to be otherwise emptied.

Various modifications and changes in the embodiments of the invention as disclosed are contemplated and may be resorted to without departing from the function or scope of the invention as hereinafter defined by the appended claims.

I claim as my invention:

1. A recirculating device comprising a supply conduit for supplying a liquid under pressure, a fitting including a Venturi tube interposed in said supply conduit and a branch tube, forming a part of said fitting, having one end opening into said Venturi tube and disposed at an angle thereto, a sump pan, a shallow open top receptacle disposed in and supported by the sump pan, a sleeve supported by said receptacle having a lower end opening into the receptacle adjacent the bottom thereof and an upper end rising from the open top of the receptacle and disposed around and connected to said branch tube for supporting the fitting above said receptacle, and a hood having a central portion disposed around and connected to the upper portion of said sleeve, said hood being supported above and around said receptacle by said sleeve and having an open bottom disposed below the liquid level in the sump pan and combining therewith to seal the open top of the receptacle whereby when a liquid is forced under pressure through the Venturi tube a suction will be created in the branch tube, sleeve, receptacle and hood for drawing liquid from the sump pan through the hood into the receptacle from the receptacle and through the sleeve and branch tube into said Venturi tube to be discharged from the fitting with the liquid supplied under pressure to the Venturi tube.

2. A recirculating device as in claim 1, a plate extending across and supported by the top of said receptacle, and said sleeve extending through and being secured in said plate.

References Cited in the file of this patent

UNITED STATES PATENTS

| | | |
|---|---|---|
| 1,428,670 | Williams et al. | Sept. 12, 1922 |
| 2,021,394 | Wade | Nov. 19, 1935 |
| 2,317,589 | Collinson | Apr. 27, 1943 |
| 2,343,269 | Aaron | Mar. 7, 1944 |
| 2,682,886 | Paxton | July 6, 1954 |
| 2,823,833 | Bauerlein | Feb. 18, 1958 |

FOREIGN PATENTS

| | | |
|---|---|---|
| 67,705 | Denmark | Sept. 13, 1948 |
| 67,953 | Denmark | Nov. 1, 1948 |
| 184,945 | Germany | May 16, 1907 |